United States Patent
Allen et al.

(10) Patent No.: US 7,617,050 B2
(45) Date of Patent: Nov. 10, 2009

(54) METHOD FOR QUANTIFYING RESISTIVITY AND HYDROCARBON SATURATION IN THIN BED FORMATIONS

(75) Inventors: David F. Allen, Katy, TX (US); Georgiy Bordakov, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 237 days.

(21) Appl. No.: 11/836,269

(22) Filed: Aug. 9, 2007

(65) Prior Publication Data

US 2009/0043510 A1 Feb. 12, 2009

(51) Int. Cl.
*G01V 1/40* (2006.01)
*E21B 49/00* (2006.01)

(52) U.S. Cl. ...................... 702/7; 73/152.06
(58) Field of Classification Search .............. 702/7, 702/13; 73/152.05, 152.06
See application file for complete search history.

(56) References Cited

U.S. PATENT DOCUMENTS

| 5,265,015 | A | * | 11/1993 | Auzerais et al. | 702/12 |
| 5,740,124 | A | | 4/1998 | Chunduru et al. | |
| 6,470,274 | B1 | * | 10/2002 | Mollison et al. | 702/7 |
| 7,363,164 | B2 | * | 4/2008 | Little et al. | 702/13 |
| 2003/0105590 | A1 | * | 6/2003 | Mollison et al. | 702/7 |

OTHER PUBLICATIONS

Allen, "Laminated sand analysis," *25th Annual Logging Symposium Transactions, Society of Professional Well Log Analysts*, Paper XX, 1984.

* cited by examiner

*Primary Examiner*—John Fitzgerald
(74) *Attorney, Agent, or Firm*—Darla P. Fonseca; Jaime Castano; Dale Gaudier

(57) ABSTRACT

A method for estimating hydrocarbon volume in a layered subsurface formation includes determining a vertical resistivity and a horizontal resistivity in the formation. A bound water saturation and a total porosity of individual layers of the formation are determined. Values of horizontal resistivity and vertical resistivity of the formation are calculated based on the bound water saturation and the total porosity for each layer and on an estimated irreducible bulk volume of water in each layer. The estimated values are compared to the determined horizontal resistivity and vertical resistivity. The estimated irreducible water saturation in each layer is adjusted and estimating the values is repeated until differences between the estimated values and the determined vertical and horizontal resistivity values fall below a selected threshold. The hydrocarbon volume is estimated from the adjusted irreducible water saturation for each layer.

15 Claims, 2 Drawing Sheets

METHOD FOR QUANTIFYING RESISTIVITY AND HYDROCARBON SATURATION IN THIN BED FORMATIONS

CROSS-REFERENCE TO RELATED APPLICATIONS

Not applicable.

STATEMENT REGARDING FEDERALLY SPONSORED RESEARCH OR DEVELOPEMENT

Not applicable.

BACKGROUND OF THE INVENTION

1. Field of the Invention

The invention relates generally to the field of analysis of well logs. More specifically, the invention relates to method for quantifying hydrocarbon volumes in laminated subsurface formations that have relatively small lamination thickness using well log data having relatively coarse resolution in the thickness direction.

2. Background Art

Well logs are used to make quantitative estimates of volume of hydrocarbon present in subsurface Earth formations. Well logs are obtained by moving various types of instruments having sensors therein along a wellbore drilled through the subsurface formations. Sensors in typical well log instruments make measurements of particular petrophysical properties of the subsurface formations, including, for example, electrical resistivity, acoustic velocity, density, natural gamma radiation, neutron porosity and dielectric constant, among others.

The sensors in the various types of well logging instruments have different axial resolution (resolution along the direction of the wellbore) and lateral depth of investigation (investigation transverse to the direction of the wellbore) into the formations surrounding the wellbore. As a general principle, greater lateral depth of investigation corresponds to coarser axial resolution. For certain types of measurements, having larger lateral depth of investigation is important because drilling a wellbore may result in displacement of fluids naturally present in the subsurface formations by the liquid phase of fluid used to drill the wellbore. Thus, for certain analyses, including determining fractional rock volume occupied by hydrocarbons, it is necessary to obtain measurements of electrical resistivity that are closely related to the resistivity at such lateral depth from the wellbore as the formation is essentially undisturbed by movement of wellbore fluid into the formation. Obtaining such laterally deep measurements unavoidably results in measurements having relatively coarse axial resolution.

Fine axial resolution is important in particular because some formations consist of a plurality of relatively thin (the thickness of a formation layer generally being defined with respect to a line transverse to the plane of the formation layer) laminations of hydrocarbon bearing (and thus typically hydrocarbon productive) rock formation interleaved with laminations of clay bearing (and consequently substantially impermeable and non-productive) rock formation.

Resistivity measuring devices known in the art may have lateral depth of investigation on the order of 1 to 3, meters from the axis of the instrument. Correspondingly, the axial resolution of such instruments is about 1 to 3 meters. Other devices, such as density and neutron porosity devices, may have axial resolution and lateral investigation depth of about $\frac{1}{10}$ to $\frac{1}{2}$ meter. Dielectric constant measuring devices, for example, may have axial resolution and lateral depth of investigation on the order of $\frac{1}{10}$ meter or less. Acoustic velocity measuring devices may have axial resolution on the order of $\frac{1}{10}$ to 1 meter.

Another resistivity measuring device, for which services are sold by the assignee of the present invention under the trademark RTSCANNER, provides estimates of resistivity of the formation in a direction along the direction of the layers of the formations and in a direction transverse to the layer direction. These resistivity values are referred to as horizontal and vertical resistivities respectively in the description of the present invention. Such device has proven useful in identifying subsurface formations consisting of the alternating productive and non-productive layers as described above. However, the relatively coarse axial resolution of the measurements provided by the foregoing instrument has limited the accuracy of quantitative evaluation of such laminated formations. There continues to be a need for methods of interpreting well log data to obtain quantitative estimates of hydrocarbon volume in place where the subsurface formations include thin laminations.

SUMMARY OF THE INVENTION

A method for estimating hydrocarbon volume in a layered subsurface formation includes determining a vertical resistivity and a horizontal resistivity in the formation. A bound water saturation and a total porosity of individual layers of the formation are determined. Values of horizontal resistivity and vertical resistivity of the formation are calculated based on the bound water saturation and the total porosity for each layer and on an estimated irreducible bulk volume of water in each layer. The estimated values are compared to the determined horizontal resistivity and vertical resistivity. The estimated irreducible water saturation in each layer is adjusted and estimating the values is repeated until differences between the estimated values and the determined vertical resistivity values fall below a selected threshold. The hydrocarbon volume is estimated from the adjusted irreducible water saturation for each layer.

A well logging method according to another aspect of the invention includes moving a well logging instrument along a wellbore drilled through a laminated subsurface formation. The instrument includes a first sensing device for determining a vertical resistivity and a horizontal resistivity in the formation and a second sensing device for determining a total porosity and an irreducible water saturation in the formation. The second sensing device has finer axial resolution than the first sensing device. Values of horizontal resistivity and vertical resistivity in the laminated formation are determined from measurements made by the first sensing device. Bound water saturation and total porosity of individual layers of the formation are determined from measurements made by the second sensing device. Values of horizontal resistivity and vertical resistivity of the formation are estimated based on the bound water saturation and the total porosity for each layer and on an estimated irreducible bulk volume of water in each layer. The estimated values are compared to the determined horizontal resistivity and vertical resistivity. The estimated irreducible water saturation in each layer is adjusted and estimating the values is repeated until differences between the estimated values and the determined vertical and horizontal resistivity fall below a selected threshold. The hydrocarbon volume is estimated from the adjusted irreducible water saturation for each layer.

Other aspects and advantages of the invention will be apparent from the following description and the appended claims.

DETAILED DESCRIPTION

Figure 1:
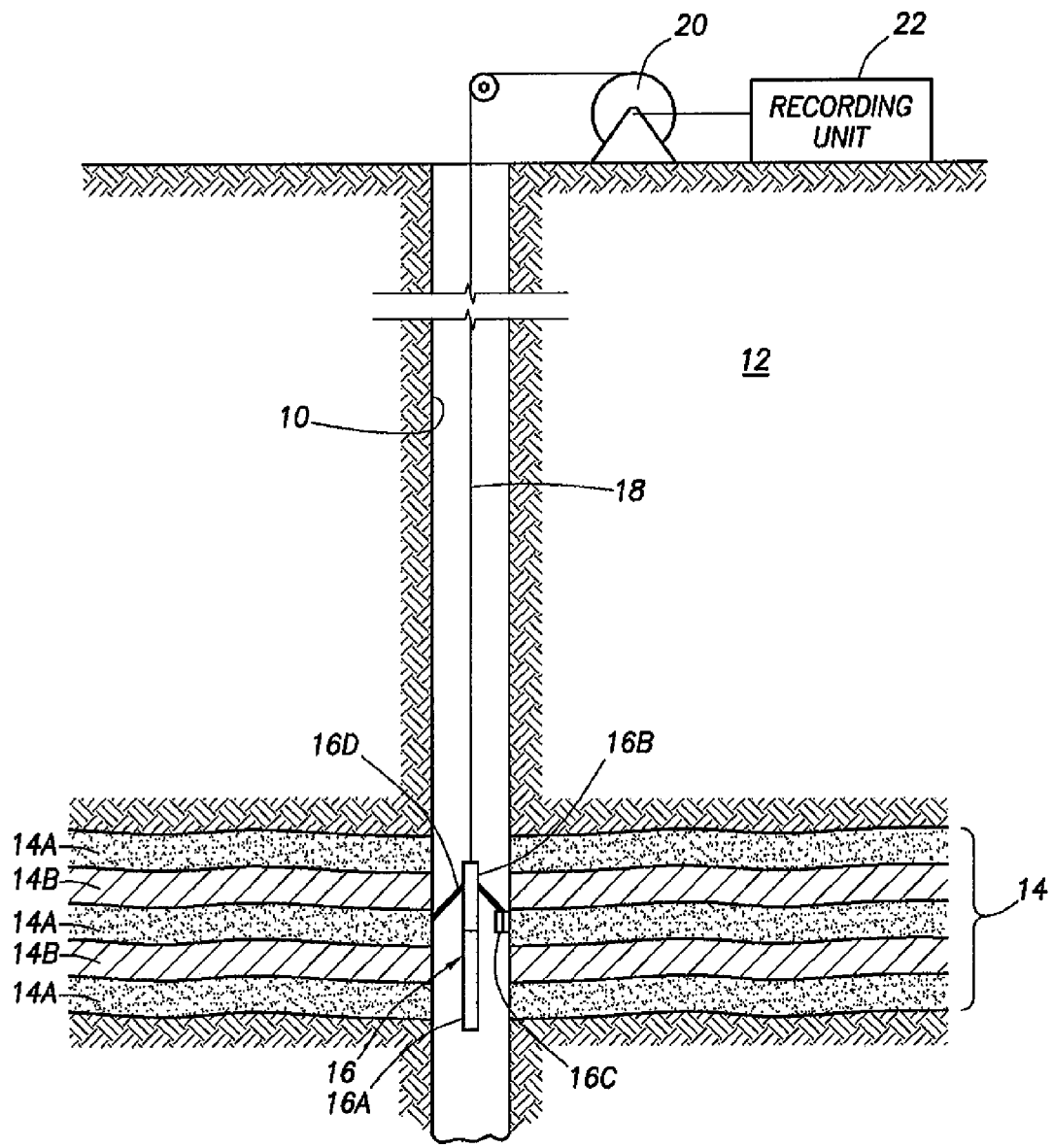
FIG. 1 shows a well logging instrument moved along a wellbore drilled through subsurface formations.

FIG. 1 shows an example well logging instrument 16 being moved along a wellbore 10 drilled through subsurface formations 12 including a hydrocarbon bearing formation 14. The instrument 16 includes at least one fine axial resolution measuring device 16B and at least one coarse axial resolution measuring device 16A having relatively greater lateral depth of investigation into the formations 12, 14 surrounding the wellbore 10 than the fine axial resolution measuring device 16B. The fine axial resolution measuring device 16B may include sensing elements (not shown separately) mounted in a skid or pad 16C urged into contact with the wall of the wellbore 10. A back up arm 16D or other biasing device may provide force to urge the skid or pad 16C into contact with the wellbore wall. The coarse axial resolution measuring device 16A may be configured to operate in the center of the wellbore 10 or at a selected offset from the center or from the wellbore wall.

The well logging instrument 16 may be moved through the wellbore 10 by an armored electrical cable 18 extended and withdrawn by a winch 20 or similar spooling device known in the art. The cable 10 may be in electrical communication with a recording unit 22 disposed at the surface, wherein signals from the instrument 16 may be recorded, decoded and interpreted. It is to be clearly understood that the manner of conveyance of the instrument 16 through the wellbore 10 is not a limit on the scope of this invention. Other conveyance devices known in the art, for example, on drill pipe, coiled tubing, production tubing and/or while drilling may also be used with the logging instrument 16 without exceeding the scope of this invention.

The formation of interest 14 may include a plurality of relatively thin layers or laminations of hydrocarbon bearing (and thus hydrocarbon productive) rock 14A, interleaved with layers of substantially impermeable, and thus non-productive, rock 14B. Typically, the productive rock layers 14A will have higher electrical resistivity than the non-productive rock layers 14B because the pore spaces therein are at lest partially occupied by electrically non-conductive hydrocarbons. For purposes of the explanation that follows, the productive layers 14A may be considered to consist of various compositions of sandstone (quartz grain porous rock), and the non-productive layers 14B may be considered to consist of various compositions of shale (substantially all clay mineral for the solid rock grains). Other mineral compositions for the layers may be used, however those skilled in the art will appreciate that the layered type formation of interest 14 shown in FIG. 1 is frequently associated with formations consisting of interleaved sand and shale layers.

In the present example, the coarse axial resolution device 16A may include resistivity sensing devices (not shown) that can make measurements corresponding to resistivity of the formation of interest 14 in a direction along the axis of the wellbore 10, or transverse to the direction of the formation layers, called "vertical resistivity." The coarse axial resolution device 16A may also include sensing elements to measure resistivity along a direction transverse to the axis of the wellbore, or along the direction of the layers, called "horizontal resistivity." Such measurements may be made to a lateral depth of investigation sufficient to be responsive to the fluid content in the productive layers 14A where fluid from the wellbore 10 has not affected the fluid present in the pore spaces of the formation layers 14A. The coarse axial resolution device 16A may include a device used to provide services under the trademark RTSCANNER, which is a trademark of the assignee of the present invention.

An objective of a method according to the invention is to determine the fractional volume of the productive rock layers 14A occupied by hydrocarbons at a depth laterally distant enough from the wellbore 10 to be essentially undisturbed by displacement by fluid from within the wellbore 10 used during the drilling thereof.

The fine axial resolution measuring device 16B may include a dielectric constant sensor (not shown separately) that can enable making quantitative estimates of the minimum fractional volume of water occupying pore spaces ("irreducible water saturation"—$Sw_{irr}$) in each of the productive rock layers 14A and in the non-productive rock layers 14B. Dielectric constant sensors are known in the art, and include an electromagnetic transmitter and one or more electromagnetic receivers at spaced apart positions from the transmitter. Attenuation and/or phase shift of an electromagnetic wave propagated from the antenna as measured at the one or more receivers is related to the dielectric constant of the formations in contact with the skid or pad 16C, depending on the frequency of the electromagnetic wave.

The fine axial resolution measuring device 16B may also include one or more types of sensing devices (not shown separately) that can provide measurements related to the fractional volume of pore space ("porosity") in the various formations 12, 14 surrounding the wellbore 10. Non-limiting examples of such porosity measuring devices include acoustic velocity, gamma-gamma density, neutron porosity and nuclear magnetic resonance ("NMR") relaxometry devices. In some examples, NMR relaxometry measurements may be used to determine a quantity of interest in each of the layers 14A, 14B.

In the description that follows, the term "saturation" means a fractional volume of pore space occupied by a designated material. Thus, "water saturation" (Sw) means a fractional amount of the total rock pore spaced occupied by water. Saturation of any material may range from zero to 100 percent (or unity if fractional representations are used). A "bulk volume" of a material is a fractional amount of the total volume or rock formation that is occupied by a particular material. The range of possible values for a bulk volume of any material that exists in rock pore spaces is thus necessarily limited to the fractional volume of pore space ("porosity").

In a method according to the invention, one saturation value of interest is "irreducible water saturation." Irreducible water saturation is the fractional volume of pore space occupied by water that essentially cannot be moved from the rock pore space because it is remains attached to the rock grains by surface tension (capillary pressure). A value of irreducible water saturation in the non-productive rock layers 14B, represented by $Sw_{irr}(clay)$ because such layers 14B are assumed in this example to consist entirely of clay minerals and bound water, may be related to a fractional volume of "bound" water (water that is bound by capillary pressure to the rock grains) in the pore spaces of the non-productive rock layers by a constant d. The constant d is related to the irreducible water saturation $Sw_{irr}(clay)$ by the expression:

$$Sw_{irr}(\text{clay}) = d \cdot Swb \quad (1)$$

in which Swb represents the bound water saturation for the particular layer. Swb may be determined by certain well log measurements, such as dielectric constant and NMR relaxometry, as previous explained.

In any rock layer, including the productive layers 14A, an irreducible water saturation may be related to the above value of clay irreducible water saturation by the expression.

$$Sw_{irr} = Sw_{irr}(\text{clay}) + \frac{BV_{irr}}{\phi_t} \quad (2)$$

in which BVirr represents the fractional volume of capillary pressure-bound (immobile) water in substantially clay-free ("clean") rock formations, and $\Phi t$ represents the total fractional volume of pore space ("porosity") in the rock formations. The porosity $\Phi t$ may be obtained from well log measurements, non-limiting examples of which include bulk density, neutron porosity, acoustic velocity, nuclear magnetic resonance relaxometry and combinations thereof. For purposes of the invention, it is only necessary that the measurements used to obtain $\Phi t$ and Swb have sufficiently fine axial resolution so as to enable determining the porosity in each of the layers.

The foregoing defines the values of BVirr, d Swb, Swirr and $\Phi t$ with respect to each layer 14A, 14B. In some examples, the foregoing values may be determined with respect to each sample value recorded by the recoding instrument 22. In some examples, the recording unit may record a sample of each well logging instrument sensor measurements every two inches of movement (about 5 cm). Values corresponding to discrete layers of formation, such as shown at 14A and 14B may be obtained by "squaring" or other known well log analysis technique for discretizing layers from well log data.

A modeled or expected value of the vertical resistivity Rv(mod) of the entire formation of interest 14 may be obtained with respect to the parameters d and BVirr in each of the layer 14A, 14B by the following expression:

$$Rv(\text{mod}) = \quad (3)$$
$$\frac{1}{n} \sum_{i=1}^{n} \frac{1}{\phi_t^{m(net)} \cdot \left[ Swb_i Cwb + \min\left(1 - Swb_i, \frac{BVirr}{\phi_{t_i}} + dSwb_i\right) Cwf \right]}$$

in which n represents the number of layers, Cwb represents the electrical conductivity of the bound water in each layer and Cwf represent the electrical conductivity of the free or movable water in each layer. Cwb and Cwf may be determined from electrical resistivity measurements, and associated porosity measurements, made in adjacent "clean" formations and in adjacent shales, or may be obtained from fine resolution measurements made in each individual layer. Swb in the i-th layer may be obtained from well log measurements, as previously explained. The value m(net) represents a "net" value for each layer of the "cementation exponent" determined according to Archie's equation:

$$R_0 = \frac{aR_w}{\phi^m} \quad (4)$$

where $R_0$ represents the resistivity of a porous formation that has its pore space completely filled with water having electrical resistivity of Rw, and a is an empirically determined constant. In the case where Swb determined for the i-th layer is above a preselected minimum value, which minimum may be determined or estimated from well log data, then the cementation exponent m(net) for that layer may be set to the value determined in rock formation layers determined to be substantially all shale. Such cementation exponent may be determined using a measured value of vertical resistivity and porosity values from a shale layer in the formation of interest 14 or in an adjacent shale formation. In cases where Swb of the i-th layer is at or below the preselected minimum value, then the cementation exponent for such layer may be set to that of a productive formation layer 14A. Such cementation exponent may be determined using equation (4) above with well log measurements made in a productive layer. Such measurements may include electrical resistivity measurements having relatively fine axial resolution (and consequent shallow depth of investigation) because the resistivity of the wellbore fluid displacing the native fluid in the pore spaces can be readily determined from measurements made at the Earth's surface.

A model or expected value of horizontal resistivity Rh for the formation of interest 14 may also be determined with respect to the parameters d and BVirr in each layer 14A, 14B by the following expression:

$$Rh(\text{mod}) = \frac{n}{\sum_{i=1}^{n} \phi_t^{m(sand)} \cdot \left[ Swb_i Cwb + \min\left(1 - Swb_i, \frac{BVirr}{\phi_{t_i}} + dSwb_i\right) Cwf \right]} \quad (5)$$

in which like parameters to those in equation (3) represent the same physical parameters. Values of Rv and Rh for each individual layer may be determined as the i-th value in the summation term of each of equations (3) and (5) respectively. Such individual values may be averaged, as will be explained below with reference to equations (7) and (8), as a quality control check on the method.

In a method according to the invention, values of d and BVirr for each layer are initialized, and modeled values of Rv and Rh are calculated as shown above in equations (3) and (5) for the formation of interest 14. The values of Rv and Rh that are modeled are then compared to the measured values of Rv and Rh from the coarse resolution measuring device 16A. The values of d and BVirr for each layer are adjusted, and the modeled values of Rv and Rh are recalculated. Adjustment may be performed by incrementing the values of D and BVirr by a fixed increment, by variable increment, or by techniques such as simulated annealing, for example. Simulated annealing in the context of well log inversion is described in U.S. Pat. No. 5,740,124 issued to Chunduru et al. The foregoing are repeated until the estimated (modeled) and measured values of Rv and Rh are substantially equal, or the differences between them fall below a selected threshold. The values of d and BVirr in each layer are determined when the modeled and measured values of Rv and Rh are substantially equal or when the differences fall below the selected threshold.

A hydrocarbon-occupied fractional volume Vhyd of the total rock volume in each layer may be calculated using the values of d and BVirr determined from the above inversion by the following expression:

$$V_{hyd} = \phi t - (\phi t * Swb) - \left(\phi t * dSwb + \frac{BVirr}{\phi t}\right) \quad (6)$$

In some instances, the inversion process will not converge to a single value of d and BVirr for each layer. In such cases a separate value of d and BVirr for each of the vertical and horizontal resistivity measurements may be determined by the above inversion process, performed separately for each of Rv and Rh, and the results of such inversion procedure used in laminated formation analysis processes known in the art.

A quality control check of the modeled values of Rv and Rh for each layer may be obtained by calculating an average of the Rv and Rh values of all the layers and comparing the average of the modeled Rv and Rh values to the values measured by the coarse axial resolution measuring device 16A. Such average may be determined by the expressions:

$$Rv(\text{avg}) = \frac{1}{n}\sum_{i=1}^{n} Rv_i(\text{mod}) \quad (7)$$

$$Rh(\text{avg}) = n \bigg/ \sum_{i=1}^{n} Rh_i^{-1}(\text{mod}) \quad (8)$$

Figure 2:
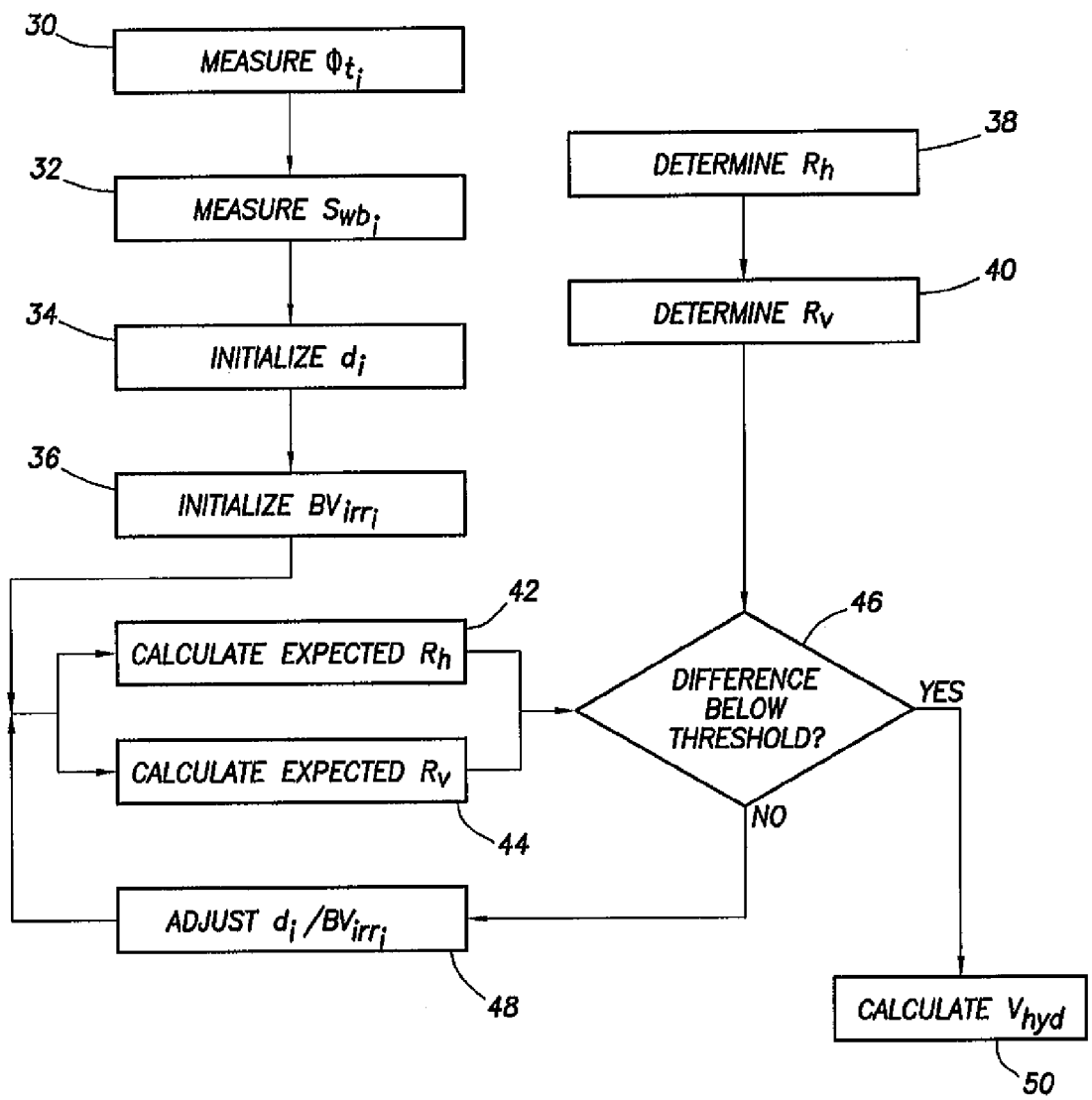
FIG. 2 is a flow chart of an example method according to the invention.

A flow chart of one example of a method according to the invention is shown in FIG. 2. At 30, the total porosity in each layer is determined. The total porosity may be determined using various axial fine resolution measurements as explained above. At 32, a value of bound water saturation in each layer is determined. Bound water saturation may be determined from certain fine axial resolution measurements as explained above.

At 38 and 40, respectively, a value of each of Rh and Rv for the productive formation is determined. Such value of Rh and Rv may be obtained from the coarse axial resolution measuring device as explained above. At 34 and 36, respectively, a value of d and BVirr is initialized for each layer. To improve the speed of operating an inversion process, the values of D and BVirr may be constrained such that d is greater than zero and BVirr is less than one. At 42, an expected value of Rh for the formation of interest is determined from the values of d and BVirr in each layer as shown above with reference to equation (5). At 44, a value of Rv for the formation can be determined as explained above with reference to equation (3). At 46, the calculated values are compared to the values obtained from the coarse axial resolution measuring device (16A in FIG. 1). If the differences fall below a selected threshold, then the hydrocarbon volume of the formation of interest may be calculated as explained with reference to equation (6). If the differences are above the selected threshold, then the values of d and BVirr for each layer can be adjusted, at 48, and the Rv and Rh calculations repeated. The foregoing is repeated until the differences, at 46, fall below the selected threshold.

Methods according to the invention may provide more accurate estimates of hydrocarbon volume in laminated subsurface formations than was possible using methods known in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What claimed is:

1. A method for estimating hydrocarbon volume in a layered subsurface formation, comprising:
   determining a vertical resistivity and a horizontal resistivity in the formation;
   determining bound water saturation and total porosity of individual layers of the formation;
   estimating values of horizontal resistivity and vertical resistivity of the formation based on the bound water saturation and the total porosity for each layer and on an estimated irreducible bulk volume of water in each layer;
   comparing the estimated values to the determined horizontal resistivity and vertical resistivity;
   adjusting the estimated irreducible water saturation in each layer and repeating estimating the values until differences between the estimated values and the determined vertical resistivity and horizontal resistivity fall below a selected threshold; and
   estimating the hydrocarbon volume from the adjusted irreducible water saturation for each layer.

2. The method of claim 1 wherein the total porosity in each Layer is determined from measurements of at least one of acoustic velocity, density, nuclear magnetic resonance relaxometry and neutron porosity.

3. The method of claim 1 wherein the irreducible water saturation in each layer is determined from measurements of at least one of electromagnetic wave attenuation and nuclear magnetic resonance relaxomeiry.

4. The method of claim 1 wherein the determined vertical and horizontal resistivities are obtained from measurements having an axial resolution more coarse than a measurement used to determine the bound water saturation.

5. The method of claim 1 further comprising estimating a value of horizontal resistivity and vertical resistivity in each layer using rite bound water saturation and total porosity of each layer, and comparing an average of the horizontal resistivity of the layers and an average of the vertical resistivity of the layers with the determined values of horizontal and vertical resistivity, respectively.

6. The method of claim 1 farther comprising determining an average of each of the estimated horizontal and vertical resistivities and comparing the averages to the determined horizontal and vertical resistivities in the formation.

7. The method of claim 1 wherein the adjusting and repeating estimating are performed by simulated annealing.

8. The method of claim 1 further comprising determining a separate value of irreducible water saturation corresponding to each of the determined horizontal and vertical resistivities when the adjusting and repeating estimating do not converge to a single value of irreducible water saturation for each layer.

9. A well logging method, comprising:
   moving a well logging instrument along a wellbore drilled through a laminated subsurface formation, the instrument including a first sensing device for determining a vertical resistivity and a horizontal resistivity in the formation and a second sensing device for determining a total porosity and an irreducible water saturation in the formation, the second sensing device having finer axial resolution than the first sensing device;

determining values of horizontal resistivity and vertical resistivity in the laminated formation from measurements made by the first sensing device;

determining bound water saturation and total porosity of individual layers of the formation from measurements made by the second sensing device;

estimating values of horizontal resistivity and vertical resistivity of the formation based on the bound water saturation and the total porosity for each layer and on an estimated irreducible bulk volume of water in each layer;

comparing the estimated values to the determined horizontal resistivity and vertical resistivity;

adjusting the estimated irreducible water saturation in each layer and repeating estimating the values until differences between the estimated values and the determined vertical resistivity and horizontal resistivity fall below a selected threshold; and estimating the hydrocarbon volume from the adjusted irreducible water saturation for each layer.

10. The method of claim 9 wherein the first sensing device includes sensors for measuring at least one of acoustic velocity, density, nuclear magnetic resonance relaxometry and neutron porosity.

11. The method of claim 9 wherein the irreducible water saturation in each layer is determined from measurements of at least one of electromagnetic wave attenuation and nuclear magnetic resonance relaxometry.

12. The method of claim 9 further comprising estimating a value of horizontal resistivity and vertical resistivity in each layer using the bound water saturation and total porosity of each layer, and comparing an average of the horizontal resistivity of the layers and an average of the vertical resistivity of the layers with the determined values of horizontal and vertical resistivity, respectively.

13. The method of claim 9 further comprising determining an average of each of the estimated horizontal and vertical resistivities and comparing the averages to the determined horizontal and vertical resistivities in the formation from the measurements made by the first sensing device.

14. The method of claim 9 wherein the adjusting and repeating estimating are performed by simulated annealing.

15. The method of claim 9 further comprising determining a separate value of irreducible water saturation corresponding to each of the determined horizontal and vertical resistivities when the adjusting and repeating estimating do not converge to a single value of irreducible water saturation for each layer.

* * * * *